United States Patent
Gavin et al.

(10) Patent No.: US 10,724,756 B2
(45) Date of Patent: Jul. 28, 2020

(54) BUILDING NETWORK DEVICE FOR GENERATING COMMUNICATION MODELS FOR CONNECTING BUILDING DEVICES TO A NETWORK

(71) Applicant: Johnson Controls Technology Company, Auburn Hills, MI (US)

(72) Inventors: Gary W. Gavin, Franklin, WI (US); Gladys Belen Ramirez-Garcia, Milwaukee, WI (US); Wesley J. Irek, Oak Creek, WI (US); Shawn D. Schubert, Oak creek, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 100 days.

(21) Appl. No.: 15/962,239

(22) Filed: Apr. 25, 2018

(65) Prior Publication Data
US 2018/0313564 A1    Nov. 1, 2018

Related U.S. Application Data

(60) Provisional application No. 62/491,701, filed on Apr. 28, 2017.

(51) Int. Cl.
*F24F 11/50*    (2018.01)
*H04L 29/06*    (2006.01)
(Continued)

(52) U.S. Cl.
CPC ............. *F24F 11/50* (2018.01); *F24F 11/30* (2018.01); *F24F 11/56* (2018.01); *F24F 11/63* (2018.01); *G05B 13/04* (2013.01); *G06F 15/76* (2013.01); *H04L 12/2803* (2013.01); *H04L 41/0886* (2013.01); *H04L 67/08* (2013.01); *H04L 67/12* (2013.01); *H04L 69/08* (2013.01); *G05B 2219/2614* (2013.01); *G06F 15/02* (2013.01)

(58) Field of Classification Search
CPC . H04L 12/2803; H04L 67/08; H04L 41/0886; G05B 13/04
See application file for complete search history.

(56) References Cited

U.S. PATENT DOCUMENTS 6,839,757 B1 * 1/2005 Romano .............. H04L 67/16
709/226
10,386,086 B2 * 8/2019 Noboa .................. F24F 11/62
(Continued)

*Primary Examiner* — Lashonda T Jacobs
(74) *Attorney, Agent, or Firm* — Foley & Lardner LLP

(57) ABSTRACT

A system for connecting a building device to a server includes a building network device including a processing circuit configured to receive one or more point identifier values from the building device via a building network. Each of the one or more point identifier values identifies a data point of the building device. The processing circuit is configured to receive one or more rules for generating a communication model for the building device from one or more memory devices. The processing circuit is configured to generate the communication model for the building device based on the received one or more point identifier values and the received one or more rules, receive, via the building network, data for the data points from the building device, and send, via the second network, the received data for the data points to corresponding data points on the server based on the communication model.

20 Claims, 8 Drawing Sheets

(51) Int. Cl.
*F24F 11/30* (2018.01)
*H04L 12/28* (2006.01)
*F24F 11/63* (2018.01)
*G06F 15/76* (2006.01)
*F24F 11/56* (2018.01)
*H04L 29/08* (2006.01)
*G05B 13/04* (2006.01)
*H04L 12/24* (2006.01)
*G06F 15/02* (2006.01)

(56) References Cited

U.S. PATENT DOCUMENTS

| | | | | |
|---|---|---|---|---|
| 10,579,023 B2* | 3/2020 | Salsbury | | G05B 11/42 |
| 2004/0088069 A1* | 5/2004 | Singh | | G06O 50/06 |
| | | | | 700/108 |
| 2005/0154494 A1* | 7/2005 | Ahmed | | G05B 15/02 |
| | | | | 700/275 |
| 2006/0271589 A1* | 11/2006 | Horowitz | | G05B 15/02 |
| 2008/0281439 A1* | 11/2008 | Salsbury | | G05D 23/1932 |
| | | | | 700/29 |
| 2012/0259595 A1* | 10/2012 | Narita | | G06Q 10/00 |
| | | | | 703/1 |
| 2014/0018940 A1* | 1/2014 | Casilli | | G05B 15/02 |
| | | | | 700/29 |
| 2014/0337001 A1* | 11/2014 | Dayalan | | G06F 30/13 |
| | | | | 703/13 |
| 2015/0293508 A1* | 10/2015 | Piaskowski | | G05B 15/02 |
| | | | | 700/275 |
| 2015/0316907 A1* | 11/2015 | Elbsat | | G05B 19/418 |
| | | | | 700/275 |
| 2015/0327010 A1* | 11/2015 | Gottschalk | | G05B 15/02 |
| | | | | 455/456.1 |
| 2016/0294446 A1* | 10/2016 | Rumler | | G05B 15/02 |
| 2016/0313752 A1* | 10/2016 | Przybylski | | G05D 23/1917 |
| 2017/0214541 A1* | 7/2017 | Brun | | H04L 12/2803 |
| 2017/0286204 A1* | 10/2017 | Dibowski | | G06F 11/0772 |
| 2017/0314800 A1* | 11/2017 | Bengea | | G05B 13/04 |
| 2017/0315697 A1* | 11/2017 | Jacobson | | G06F 16/26 |
| 2018/0099454 A1* | 4/2018 | Hummeler | | B33Y 10/00 |
| 2018/0262573 A1* | 9/2018 | Przybylski | | G06F 3/0484 |
| 2019/0280889 A1* | 9/2019 | Malakuti | | H04L 12/281 |

* cited by examiner

BUILDING NETWORK DEVICE FOR GENERATING COMMUNICATION MODELS FOR CONNECTING BUILDING DEVICES TO A NETWORK

CROSS-REFERENCE TO RELATED PATENT APPLICATION

This application claims the benefit of and priority to U.S. Provisional Patent Application No. 62/491,701 filed Apr. 28, 2017, the entire disclosure of which is incorporated by reference herein.

BACKGROUND

The present disclosure relates generally to a heating, ventilation, and air conditioning (HVAC) system. More particularly, the present disclosure relates to a network device for network communication.

In a building, an HVAC system can operate to control an environmental condition of the building. The HVAC system can include multiple pieces of building equipment that can operate to control the environmental conditions. These pieces of building equipment may operate based on settings received via a network and can collect data of the building and provide the data to other building devices. The settings or collected data may be referred to as "point data" and may be specific data points for control set points, measured environmental conditions, etc. The point data can be communicated among the various pieces of building equipment via a network. For example, a controller could collect temperature data points for a particular zone based on a temperature sensor measuring the temperature data point. The point data can be communicated via various building specific networks e.g., building automation and control network (BACnet) protocols can be implemented on each of the pieces of building equipment enabling the communication of point data.

SUMMARY

One implementation of the present disclosure is a system for connecting a building device to a server. The system includes a building network device including a processing circuit configured to receive one or more point identifier values from the building device via a building network. Each of the one or more point identifier values identifies a data point of the building device. The processing circuit is configured to receive one or more rules for generating a communication model for the building device from one or more memory devices and generate the communication model for the building device based on the received one or more point identifier values and the received one or more rules. The communication model maps the data points of the building device to corresponding data points of the server. The processing circuit is configured to receive, via the building network, data for the data points from the building device and send, via the second network, the received data for the data points to the corresponding data points on the server based on the communication model.

In some embodiments, the building network device includes the one or more memory devices. In some embodiments, the one or more memory devices are configured to store the one or more rules for generating the communication model.

In some embodiments, the one or more rules include one or more identifier patterns that associate particular patterns of the one or more point identifier values with particular communication models. In some embodiments, the processing circuit is configured to generate the communication model for the building device by performing pattern matching with the one or more identifier values and the one or more identifier patterns of the one or more rules, determining, based on the pattern matching, that the one or more identifier values match a particular identifier pattern of the one or more identifier patterns, the particular identifier pattern is associated with a particular communication model, and generating the communication model based on the particular communication model.

In some embodiments, the processing circuit of the building network device is configured to generate the communication model for the building device by determining an identity of the building device based on the one or more point identifier values and the one or more rules and retrieving the communication model for the building device from the server based on the identity of the building device.

In some embodiments, the processing circuit of the building network device is configured to receive, from the building device via the building network, metadata identifying the building device, determine whether the metadata identifying the building device identifies a recognized building device, generate the communication model based on the metadata identifying the building device in response to a determination that the metadata identifies the recognized building device, and generate the communication model for the building device based on the received one or more point identifier values and the received one or more rules in response to a determination that the metadata does not identify the recognized building device.

In some embodiments, the processing circuit of the building network device is configured to receive, via the building network, point identifiers for a system of building devices including building devices, generate a system communication model for the system of building devices based on the received one or more rules, receive, from the building devices via the building network, data for data points of the system of building devices, and send, via the second network, the received data for the data points of the system of building devices to corresponding points of the system of building devices on the server based on the system communication model.

In some embodiments, the server includes the one or more memory devices. In some embodiments, the processing circuit of the building network device is configured to receive the one or more rules for generating the communication model for the building device from the one or more memory devices by receiving, via the second network, the one or more rules from the one or more memory devices of the server.

In some embodiments, the one or more rules from the one or more memory devices include one or more developer defined rules and one or more custom rules generated based on user feedback.

In some embodiments, the building device is a heating or cooling device configured to control an environmental condition of a building based on the data of the data points.

In some embodiments, the system includes the server. In some embodiments, the server includes a processing circuit configured to receive communication models, each communication model for one type of building device, each communication model is generated, at least in part, based on user input and generate a custom rule for the one type of building device based on the communication models. In some embodiments, the custom rule includes a custom point identifier pattern.

In some embodiments, the processing circuit of the building network device is configured to receive, via the building network, one or more second point identifier values for a second building device, the second building device is the one type of building device. In some embodiments, the processing circuit is configured to receive the custom rule for the one type of building device from the server and generate a second communication rule based on the custom rule and the received one or more second point identifier values.

In some embodiments, the processing circuit of the building network device is configured to cause a user device to display an interface including a description of the communication model, receive user modifications to the communication model from the user device, generate an updated communication model based on the received user modifications and the communication model, and send, via the second network, the received data for the data points to the corresponding points on the server based on the updated communication model.

In some embodiments, the description includes an identification of point names and a suggested point identifier value of the one or more point identifier values for each of the point names.

Another implementation of the present disclosure is a building network device for connecting a building device to a server. The building network device includes a processing circuit configured to receive one or more point identifier values from the building device via a building network. Each of the one or more point identifier values identifies a data point of the building device. The processing circuit is configured to receive one or more rules for generating a communication model for the building device from one or more memory devices. The processing circuit is configured to generate the communication model for the building device based on the received one or more point identifier values and the received one or more rules, the communication model maps the data points of the building device to corresponding data points of the server. In some embodiments, the processing circuit is configured to receive, via the building network, data for the data points from the building device and send, via the second network, the received data for the data points to the corresponding data points on the server based on the communication model.

In some embodiments, the one or more rules include one or more identifier patterns that associate particular patterns of the one or more point identifier values with particular communication models. In some embodiments, the processing circuit is configured to generate the communication model for the building device by performing pattern matching with the one or more identifier values and the one or more identifier patterns of the one or more rules, determining, based on the pattern matching, that the one or more identifier values match a particular identifier pattern of the one or more identifier patterns, the particular identifier pattern is associated with a particular communication model, and generating the communication model based on the particular communication model.

In some embodiments, the processing circuit of the building network device is configured to receive, from the building device via the building network, metadata identifying the building device, determine whether the metadata identifying the building device identifies a recognized building device, generate the communication model based on the metadata identifying the building device in response to a determination that the metadata identifies the recognized building device, and generate the communication model for the building device based on the received one or more point identifier values and the received one or more rules in response to a determination that the metadata does not identify the recognized building device.

In some embodiments, the processing circuit of the building network device is configured to cause a user device to display an interface including a description of the communication model. In some embodiments, the description includes a identification of point names and a suggested point identifier value of the one or more point identifier values for each of the point names. In some embodiments, the processing circuit is configured to receive user modifications to the communication model from the user device, generate an updated communication model based on the received user modifications and the communication model, and send, via the second network, the received data points to the corresponding points on the server based on the updated communication model.

Another implementation of the present disclosure is a method for connecting a building device to a server by a building network device. The method includes receiving, by the building network device, one or more point identifier values from the building device via a building network. Each of the one or more point identifier values identifies a data point of the building device. The method includes receiving, by the building network device, one or more rules for generating a communication model for the building device from one or more memory devices. The method includes generating, by the building network device, the communication model for the building device based on the received one or more point identifier values and the received one or more rules. The communication model maps the data points of the building device to corresponding data points of the server. Generating, by the building network device, the communication model for the building device includes performing pattern matching with the one or more identifier values and one or more identifier patterns of the one or more rules, determining, based on the pattern matching, that the one or more identifier values match a particular identifier pattern of the one or more identifier patterns, the particular identifier pattern is associated with a particular communication model, and generating the communication model based on the particular communication model. The method includes receiving, by the building network device via the building network, data for the data points from the building device and sending, by the building network device via the second network, the received data for the data points to the corresponding data points on the server based on the communication model.

In some embodiments, the method includes causing, by the building network device, a user device to display an interface including a description of the communication model. In some embodiments, the description includes a identification of a point names and a suggested point identifier value of the one or more point identifier values for each of the point names. In some embodiments, the method includes receiving, by the building network device, user modifications to the communication model from the user device, generating, by the building network device, an updated communication model based on the received user modifications and the communication model, and sending, by the building network device via the second network, the received data for the data points to the corresponding points on the server based on the updated communication model.

In some embodiments, the method includes receiving, by the server, communication models, each communication model for one type of building device, each communication model is generated, at least in part, based on user input, generating, by the server, a custom rule for the one type of building device based on the communication models, the custom rule includes a custom point identifier pattern, receiving, by the building network device via the building network, one or more second point identifier values for a second building device, the second building device is the one type of building device. In some embodiments, the method includes receiving, by the building network device, the custom rule for the one type of building device from the server and generating, by the building network device, a second communication rule based on the custom rule and the received one or more second point identifier values.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
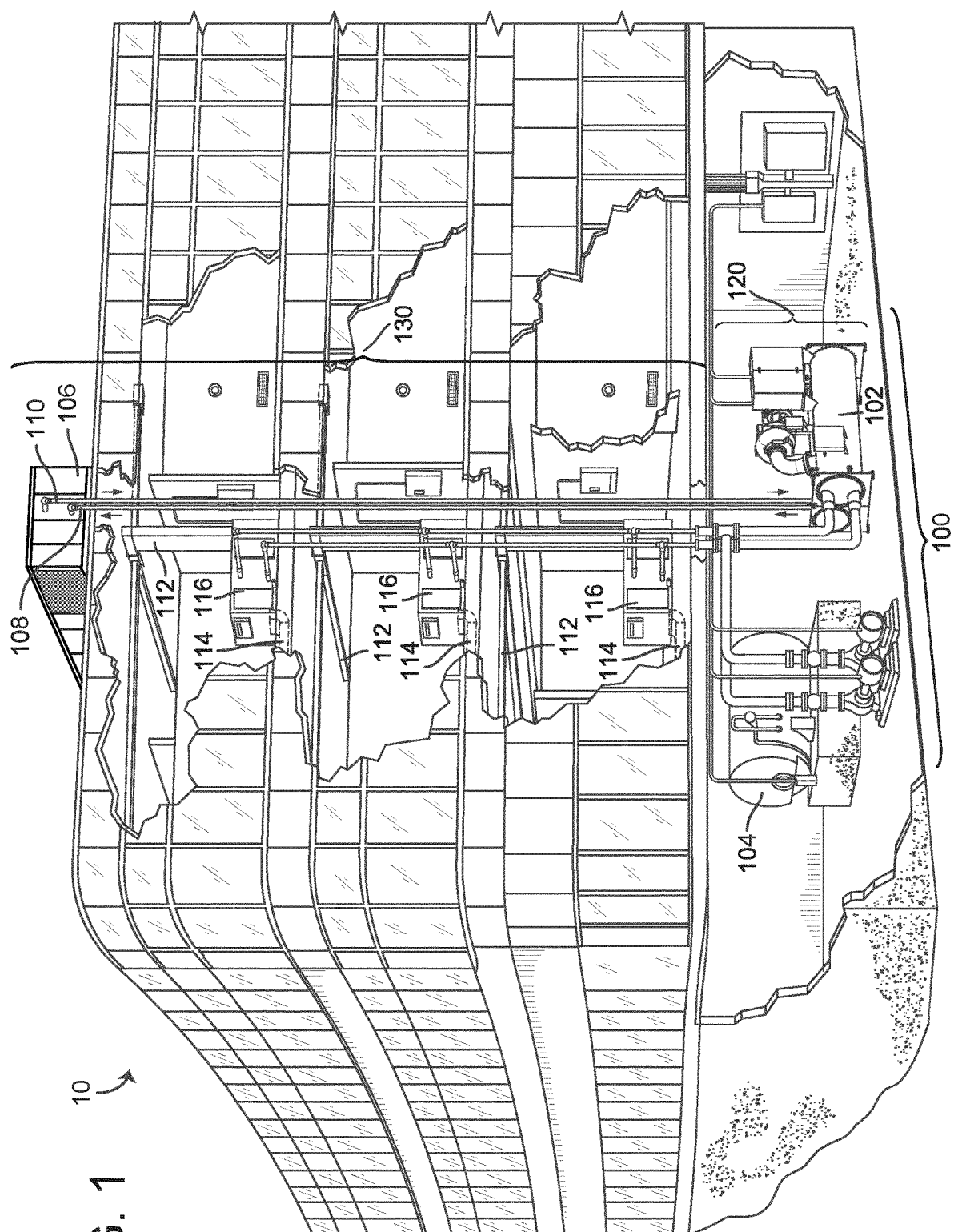
FIG. 1 is a drawing of a building equipped with a HVAC system, according to an exemplary embodiment.

Referring generally to the FIGURES, systems and methods for cloud connecting building devices via a cloud-box are shown, according to an exemplary embodiment. The cloud-box may be a device that connects a building device that communicates via a building network (e.g., a building automation and control networking protocol (BACnet)) to a cloud (e.g., a wide area network (WAN) e.g., the Internet). The cloud-box can be configured to map points of the building device to a server based on a model for the building device. A "model" as referred to herein may be a file and/or other data structure that resides on the cloud-box and contains information mapping points of a building device to corresponding points in a cloud server. The cloud-box can be configured to generate and/or determine the model for any device connected to the cloud-box. This method can be understood as "generic" since models can be dynamically generated for any kind of building device.

In some embodiments, the dynamically created model may be generated by the cloud-box based on a set of rules. In some embodiments, the set of rules indicate that particular sets of points of particular building devices should be mapped in particular ways. The cloud-box can be configured to receive the points by communicating with the building device and performing a field point discovery process. In various embodiments, the cloud-box can be configured to retrieve metadata for the building device.

The cloud-box can use a pattern matching process to determine a model for the equipment. The process may utilize point object identifiers (e.g., numbers representing the point), names, and descriptions to determine an equipment definition. The cloud-box may utilize a set of rules for determining the model for the equipment. These rules may be stored in a database. The database may be stored on the cloud-box and/or on the server. In various embodiments, the database exists on both the cloud-box and the server, the cloud-box may receive updates from the server to update the rules stored in the database periodically and/or whenever updates are available.

In one example, a device that has a particular set of points may be identified by the cloud-box as an air handler unit (AHU) based on the particular set of points and the rules. The cloud-box can be configured generate a model for the device based on the points and the rules and present the generated model to a user via a web based user interface or any other type of interface. In some embodiments, a user, via a user device, can review the model generated by the cloud-box and modify the model. In some embodiments, the cloud-box may allow a user to manually generate the model via the web based user interface. Once the model has been presented to the user for review and/or modification, the cloud-box can be configured to send the model to the server to be used to improve the rules and thus improve the pattern matching process over time.

Building Management System and HVAC System

Figure 2:
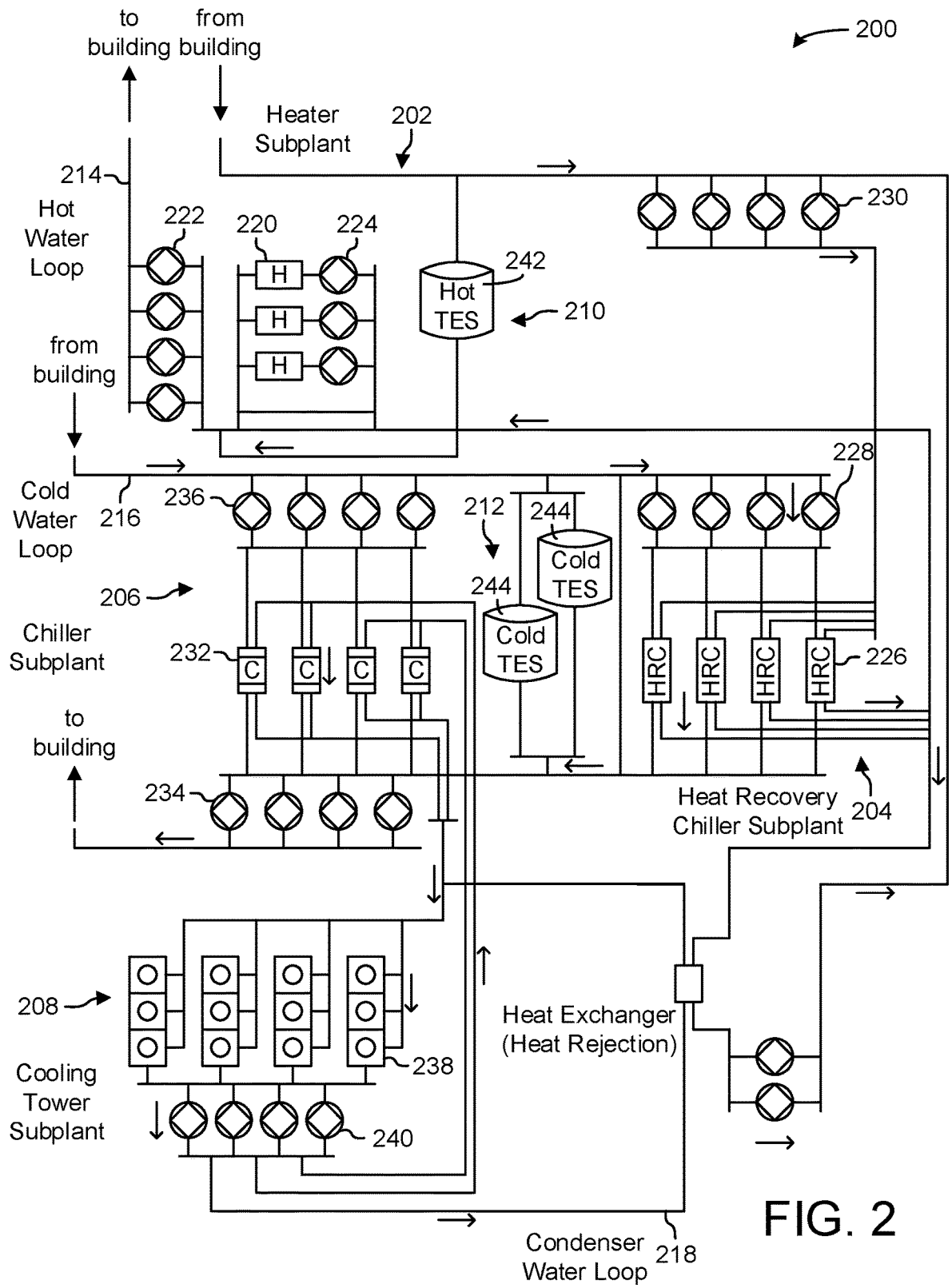
FIG. 2 is a block diagram of a waterside system that may be used in conjunction with the building of FIG. 1, according to an exemplary embodiment.
Figure 3:
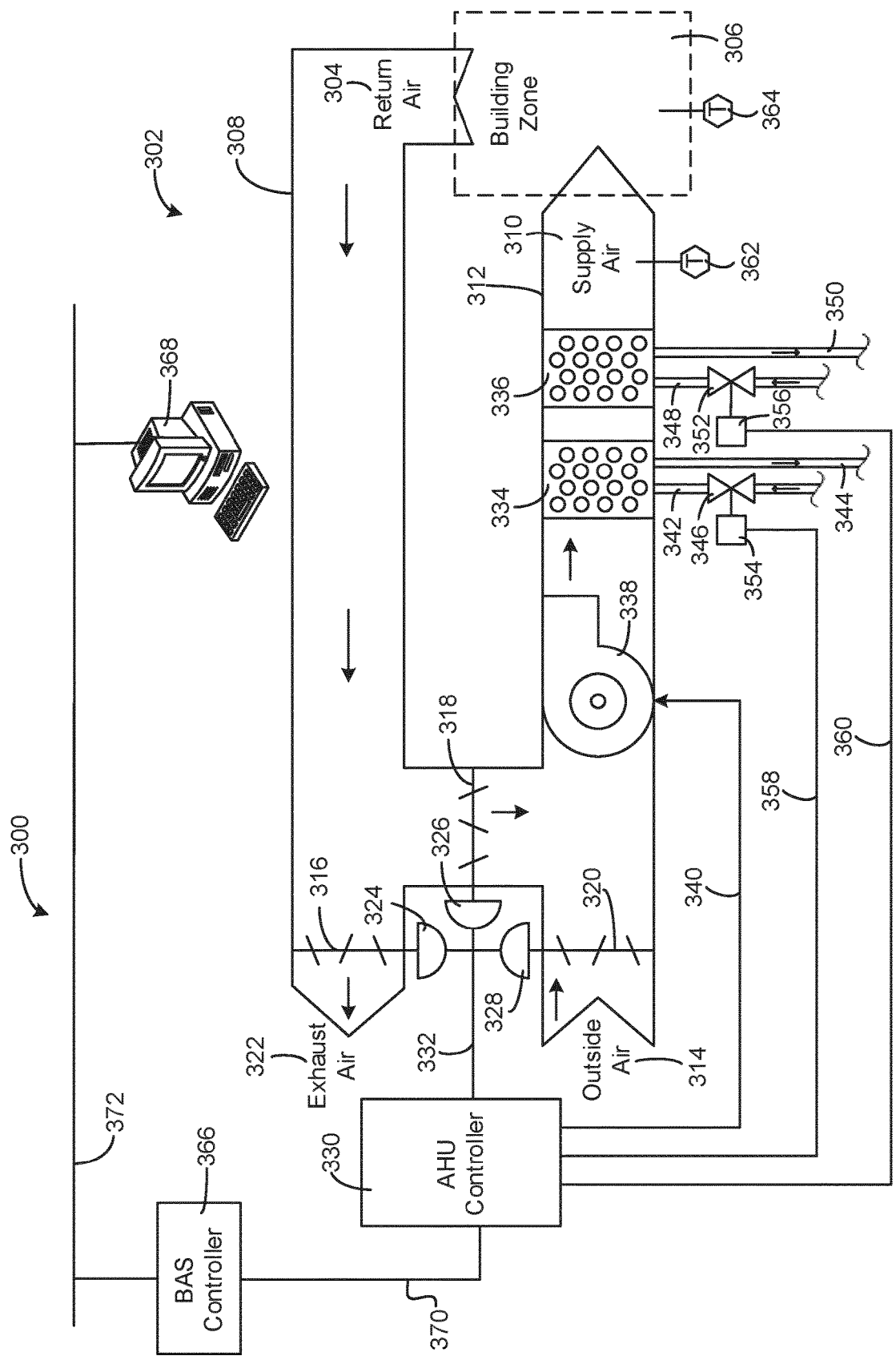
FIG. 3 is a block diagram of an airside system that may be used in conjunction with the building of FIG. 1, according to an exemplary embodiment.

Referring now to FIGS. 1-3, an exemplary building management system (BMS) and HVAC system in which the systems and methods of the present invention can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include multiple HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a multiple subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include multiple heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include multiple chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include multiple heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include multiple cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Cloud-Box

Figure 4A:
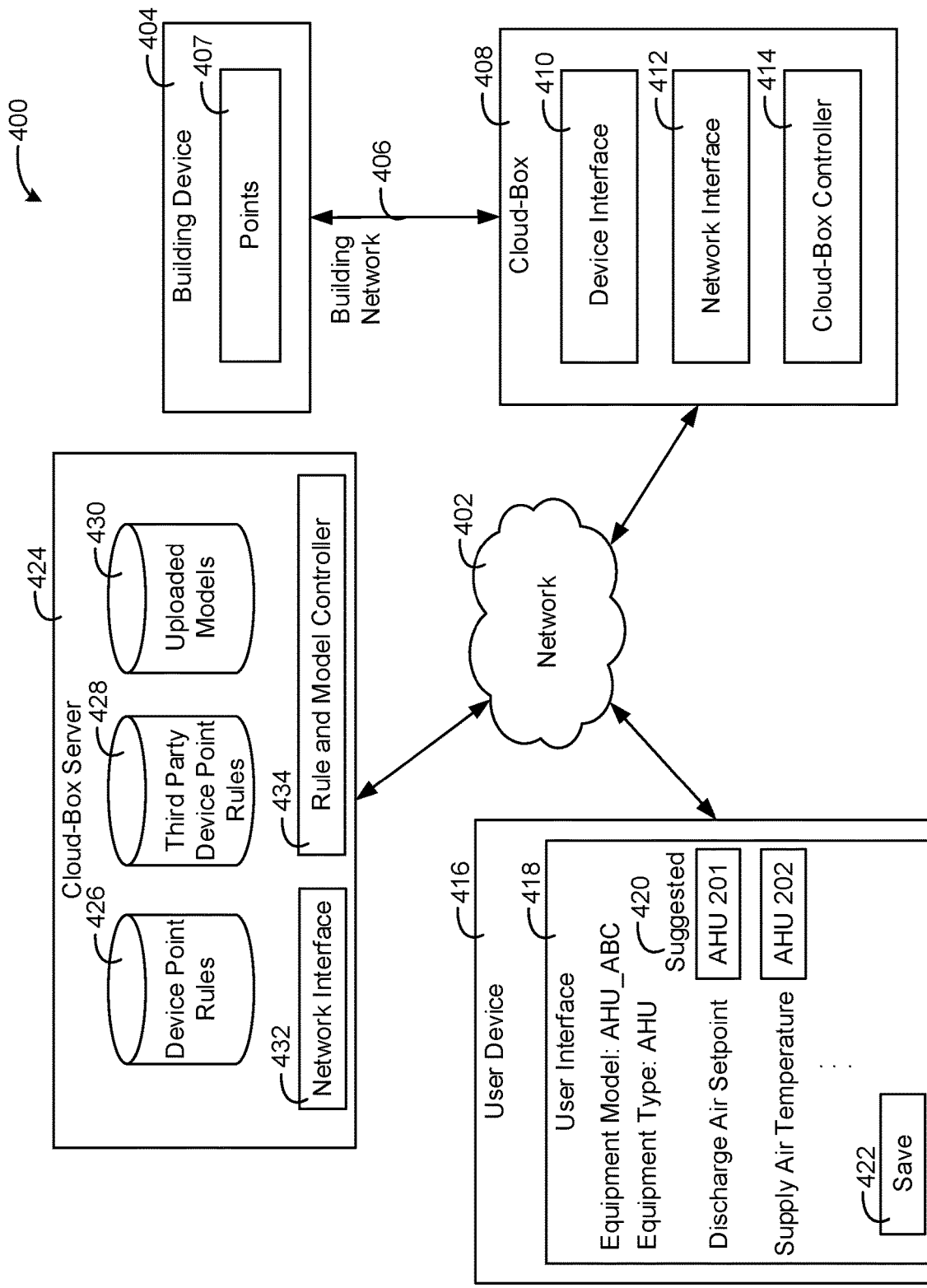
FIG. 4A is a block diagram of a system including a cloud-box that determines a model for a building device, according to an exemplary embodiment.

Referring now to FIG. 4A, a system 400 including a cloud-box configured to connect a building device to a server and generate a model for the building device is shown, according to an exemplary embodiment. System 400 is shown to include cloud-box 408 and building device 404. The cloud-box 408 may be a network enabled device, e.g., a device gateway. Building device 404 may be any piece of building equipment and/or controller for building equipment. In some embodiments, building device 404 is an AHU 106, a boiler, a chiller 102, and/or a VAV 116, as described with reference to FIGS. 1-3. Further, building device 404 may be a compressor, a controller (e.g., BAS controller 366, AHU controller 330, a field equipment controller (FEC), a network integration engine (NIE), an input output module (IOM), etc.), a thermostat, a sensor, an actuator, and/or any other building device or combination thereof.

Cloud-box 408 may be a box that connects building device 404 to cloud-box server 424, user device 416, and/or network 402. Cloud-box 408 can be further configured to generate a model for building device 404 that cloud-box 408 can be configured to use to map points on building device 404 to cloud-box server 424. Cloud-box 408 is shown to be configured to communicate via both building network 406 and network 402. Cloud-box 408 can be configured to utilize device interface 410 to communicate with building device 404 via building network 406 and utilize network interface 412 to communicate via network 402 with cloud-box server 424 and/or user device 416. In some embodiments, cloud-box 408 includes a single network interface that includes the functionality of device interface 410 and network interface 412.

Cloud-box 408 is shown to include cloud-box controller 414. Cloud-box controller 414 can be configured to generate and/or select a model for building device 404, present the model to user device 416 for review and/or modification by a user of user device 416, and use the model to map points between building device 404 and cloud-box server 424. Cloud-box controller 414 can be configured to perform a point discovery process and discover the points of building device 404, that is, points 407. Based on the discovered points, cloud-box controller 414 can be configured to generate and/or select a model for building device 404 based on rules retrieved from cloud-box server 424 and/or stored by cloud-box 408. In some embodiments, cloud-box 408 can be configured to retrieve the rules. In various embodiments, cloud-box server 424 can be configured to generate the model based on points 407 received from cloud-box controller 414.

In some embodiments, points 407 includes point identifiers (IDs), point descriptions, and/or point names. Further, cloud-box controller 414 can be configured to retrieve metadata from building device 404, the metadata can further be used to identify building device 404. In one case, points 407 and/or metadata retrieved from building device 404 may identify the type of building device 404, for example, points 407 and/or the metadata may explicitly identify building device 404 as a particular type of building device that has a model name (e.g., "AHU Controller Model A," "Cantilevered Thermostat Release C," etc.). In this case, cloud-box controller 414 may retrieve a model for the particular building device 404 (e.g., a model for "AHU Controller Model A"). In another case, points 407 may not identify building device 404 explicitly. In this case, cloud-box controller 414 can be configured to retrieve rules from cloud-box server 424. Based on the rules, cloud-box controller 414 can be configured to use points 407 and the rules to generate a model for the building device 404.

In some embodiments, the rules are sets of point identifiers, point names, and/or point descriptions that correspond to particular devices (e.g., to particular device definitions). In this embodiment, cloud-box controller 414 uses a matching process to match identifiers of points 407 against the sets of point identifiers to properly determine a model for building device 404. In this regard, the rules may be a combination of rules and definitions. If certain rules are met, e.g., building device 404 has a certain set of points, the definition of the building device 404 is a particular definition. In this regard, the rules may be a multiple rules for multiple different possible building devices.

Building network 406 may be a network for building devices (e.g., building device 404). In some embodiments, building network 406 may be a serial network, a wireless network, a local area network (LAN), and/or a WAN. For example, the network 406 may be a wired serial RS-485 network for BACnet Master Slave Token Passing (MSTP) based communication. In some embodiments, building network 402 is one and/or a combination of Wi-Fi, Zigbee, BACnet, CAN, LoRa, Modbus, LonTalk, Z-Wave, etc. Network 402 may be a WAN such as the Internet. In some embodiments, network 402 includes LAN networks, MAN networks, and/or any other kind of network. In various embodiments, network 402 is at least one of Ethernet and/or Wi-Fi. In various embodiments, network 402 is and/or includes 2G, 3G, and/or LTE. Network 402 may facilitate communication via various Internet Protocols (e.g., IPv4, IPv6, etc.).

User device 416 is shown to include a user interface 418. User device 416 can be configured to display a model for building device 404 that user device 416 can be configured to receive from cloud-box 408. User device 416 can be a smartphone, a tablet, a laptop computer, a desktop computer, and/or any other device that can communicate via network 402. User interface 418 may include a display screen (e.g., a CRT display, an LCD display, etc.), a touch screen (e.g., a resistive touchscreen, a capacitive touch screen, etc.), and/or devices that a user can use to interact with user device 416 (e.g., buttons, keyboards, a mouse, etc.).

User interface 418 is shown to display a model for building device 404. In this regard, user device 416 can be configured to receive a model for building device 404 from cloud-box 408 and cause user interface 418 to display the model. In some embodiments, user device 416 can receive input such as modifications to the model, acceptance of the model, and/or rejection of the model via user interface 418. User device 416 can be configured to send the inputs to cloud-box 408.

In FIG. 4A, user interface 418 is shown to display an equipment model, AHU_ABC. Further, user interface 418 is shown to display the equipment type, AHU. Further, user interface 418 displays the mapping of points 407. In this example, the point "AHU 201" is mapped as "Discharge Air Setpoint" while point "AHU 202" is mapped as "Supply Air Temperature." The values "Discharge Air Setpoint" and "Supply Air Temperature" may represent points in cloud-box server 424. In this regard, the actual points of building device 404, points 407, represented by "AHU 201" and "AHU 202" are mapped to points in cloud-box server 424, "Discharge Air Setpoint" and "Supply Air Temperature." These suggestions are listed under suggested 420. A user may be able to manually adjust the setpoints mapped to the various descriptions. User interface 418 is further shown to include a save button 422. Interacting with save button 422 may cause user device 416 to send the model displayed on user interface 418 and/or modified by a user to cloud-box 408 for use in mapping points 407 between building device 404 and cloud-box server 424.

Cloud-box server 424 is shown to include various components and databases. The databases shown in cloud-box server 424 may be memory components such as hard drives, RAM, ROM, etc. In some embodiments, the databases are SQL databases, Oracle Databases, relational database management systems (RDMS), graph databases, XML databases, real-time databases, key-value databases, and/or any other type of data storage and/or combination thereof.

Cloud-box server 424 is shown to include device point rules 426, third party device point rules 428, and uploaded models 430. Device point rules 426 may be configured to store rules for generating models for building device 404. The rules may indicate that particular sets of points as identified by point identifiers, descriptions, and names may be points for particular types of units and should be used to generate particular models for building device 404. Third party device point rules 428 can be a repository of rules for generating a model for particular sets of points that are points for devices created by a third party entity.

In some embodiments, as models are generated for various building devices, cloud-box server 424 may receive the points used to generate the model and may update the rules stored in third party device point rules 428 based on the generated model and the points for which the model was generated. Uploaded models 430 may store an archive of generated models. In some embodiments, uploaded models 430 stores models that are known for particular types of building devices. In this regard, uploaded models 430 may store both user generated models and official models. Every time cloud-box controller 414 generates a new model for a new building device, cloud-box controller 414 can be configured to send the new model to cloud-box server 424 for storage. In various embodiments, cloud-box server 424 can use the new model to update the rules stored in device point rules 426 and/or third party device point rules 428 to improve the functionality of the model generation. In various embodiments, when cloud-box controller 414 generates a new model for a new piece of building equipment, cloud-box server 424 can be configured to generate a new database of rules (e.g., third party device point rules 428) for the new device and/or add more rules to an already existing database (e.g., device point rules 426 and/or third party device point rules 428). This may be useful for generating models for third party devices or other devices that are "unknown" to cloud-box server 424 and/or cloud-box 408.

Network interface 432 can be configured to allow cloud-box server 424 to communicate via network 402. Network interface 432 can be configured to facilitate communication with cloud-box 408 and/or user device 416 via cloud-box 408. Rule and model controller 434 can be configured to retrieve rules from device point rules 426 and/or third party device point rules 428 and send the rules to cloud-box 408. In some embodiments, rule and model controller 434 sends rules to cloud-box 408 in response to receiving a request for the rules. In various embodiments, rule and model controller 434 can be configured to retrieve models from uploaded models 430 and send the models to cloud box 408. In some embodiments, rule and model controller 434 receives an equipment model identification, e.g., "AHU_ABC," and retrieves a model from uploaded models 430 for "AHU_ABC."

Rule and model controller 434 can be configured to update the rules stored in device point rules 426 and/or third party device point rules 428 based on one or more models received from cloud-box 408. In some embodiments, each time rule and model controller 434 receives a new model for a particular set of points, rule and model controller 434 can be configured to update the rules stored in device point rules 426 and/or third party device point rules 428 via a machine learning algorithm (e.g., supervised learning algorithms, unsupervised learning algorithms, reinforcement learning algorithms, etc.). In some embodiments, the machine learning algorithm may use decision trees, naive bayes classifications, regressions, neural networks, etc.

Figure 4B:
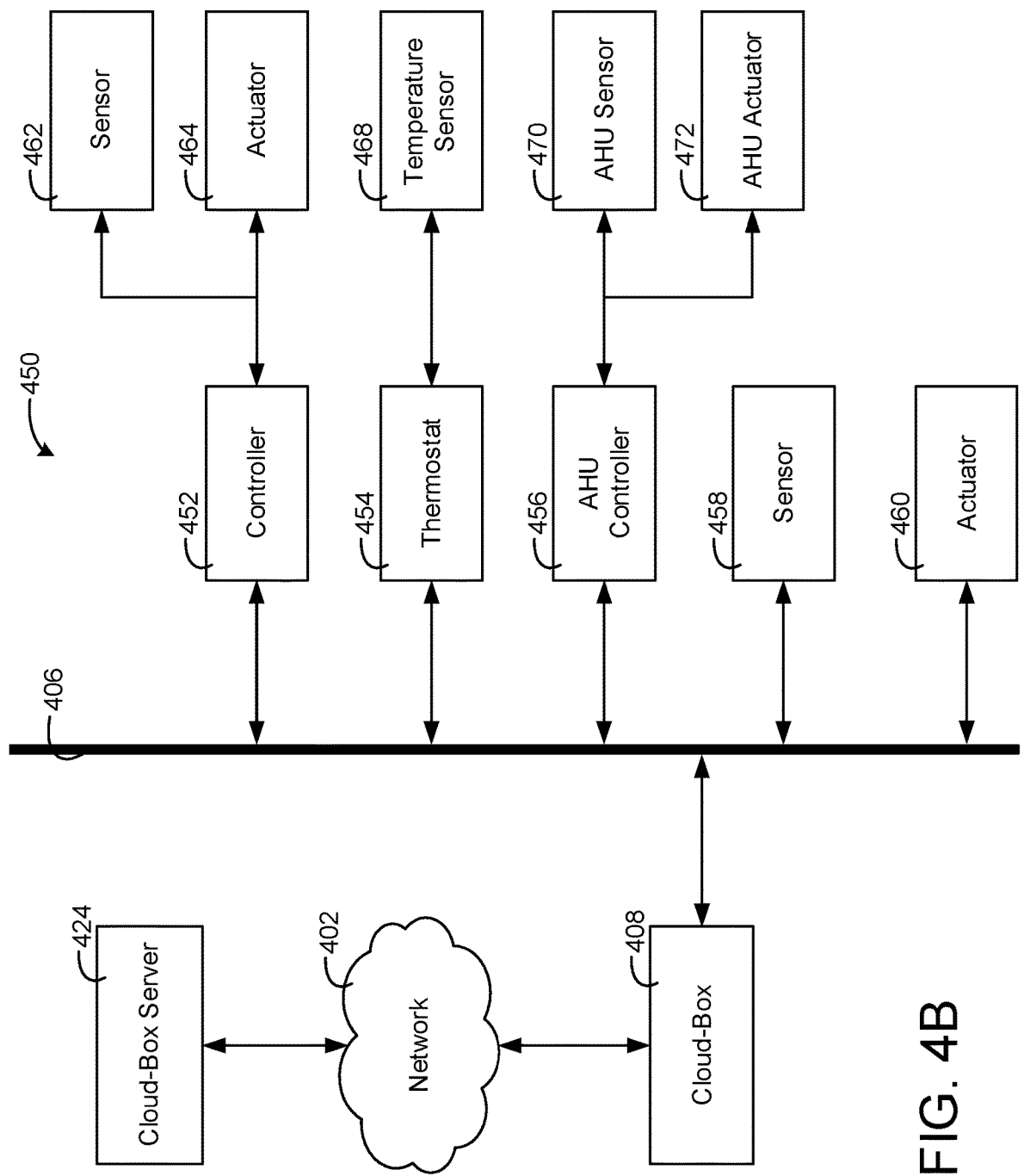
FIG. 4B is a block diagram of a building system including the cloud-box of FIG. 4A determining a model for the building system, according to an exemplary embodiment.

Referring now to FIG. 4B, a system 450 is shown including cloud-box 408 communicating via building network 406 and network 402. Cloud-box 408 is shown to communicate to multiple devices via building network 406 and the cloud-box server 424 via network 402. The point-mapping functionality described with reference to FIG. 4A for mapping points of a single device can also be implemented for a system of devices. In this regard, cloud-box 408 can communicate with the system of devices shown in FIG. 4B, generate a system model based on the devices communicating to the cloud-box 408 via building network 406, and communicate point date from the system of devices to the cloud-box server 424 and vice versa.

System 450 is shown to include a controller 452, a sensor 462, and an actuator 464. Controller 452 can be configured to generate control commands for actuator 464 based on point data collected via sensor 662 and/or based on control setpoints received via network 402 via cloud-box 408. Controller 452 could be a thermostat configured to measure building temperature via sensor 462 and generate heating and/or cooling commands for actuator 464 which may be a chiller, an AHU system, a furnace, an air conditioner, a heat pump, etc.

System 450 is shown to include AHU controller 456, AHU sensor 470, and AHU actuator 472. AHU controller 456 can be a controller configured to receive control setpoints via network 402 and/or generate commands to control actuator 472 based on environmental condition measurements of AHU sensor 470. For example, AHU sensor 470 may be a supply duct pressure configured to measure and report a supply duct pressure setpoint to AHU controller 456 while AHU actuator 472 may be a supply fan for the supply duct. AHU controller 456 may store a supply duct pressure setpoint (e.g., a setpoint data point received from cloud-box server 424 via network 402). Based on the measured supply duct pressure measured via AHU sensor 470 and/or based on a supply duct pressure setpoint, AHU controller can generate a control commands and operate AHU actuator 472 according to the generated control commands.

Thermostat 454 may be a wall mounted control device that a user selects a temperature setpoint for a building and/or area of a building. Thermostat 454 can measure ambient air temperature via temperature sensor 468 and can control the building or area of the building based on a temperature setpoint and the measured ambient air temperature. Sensor 458 may be the same as and/or similar to sensor 462, temperature sensor 468, and/or AHU sensor 470. However, sensor 458 can be configured to communicate via building network 406 and/or with cloud-box 408 directly. Similarly, actuator 460 can be the same as and/or similar to actuator 464 and/or AHU actuator 472. However, actuator 460 can be configured to communicate directly with building network 406 and/or directly with cloud-box 408.

Cloud-box 408 can be configured to generate and/or determine a model for mapping the points of the devices of system 450 and/or communicating the mapped points to cloud-box server 424 or another device connected to network 402. In some embodiments, the model that cloud-box 408 generates identifies some and/or all of the building devices. For example, the model can be a single model including various sub-models each specific to a particular piece of building equipment. In some embodiments, the model may be a high level model may indicate a particular "package" of devices. For example, the package of building devices may include a thermostat, a temperature sensor, an AHU controller, an AHU sensor, and an AHU actuator. Therefore, a particular building model could be loaded in the cloud-box 408 if thermostat 454, temperature sensor 468, AHU controller 456, AHU sensor 470, and AHU actuator 472 are all detected in system 450. The building models could be particular building models for HVAC, security, fire prevention, and/or any other "package" of building devices.

For example, a particular intrusion system may include various sensors, cameras, and/or access devices all installed in a lobby. Upon detection of the package of building devices, the cloud-box 408 can generate and/or load a model specific to the package of identified building devices.

Figure 5:
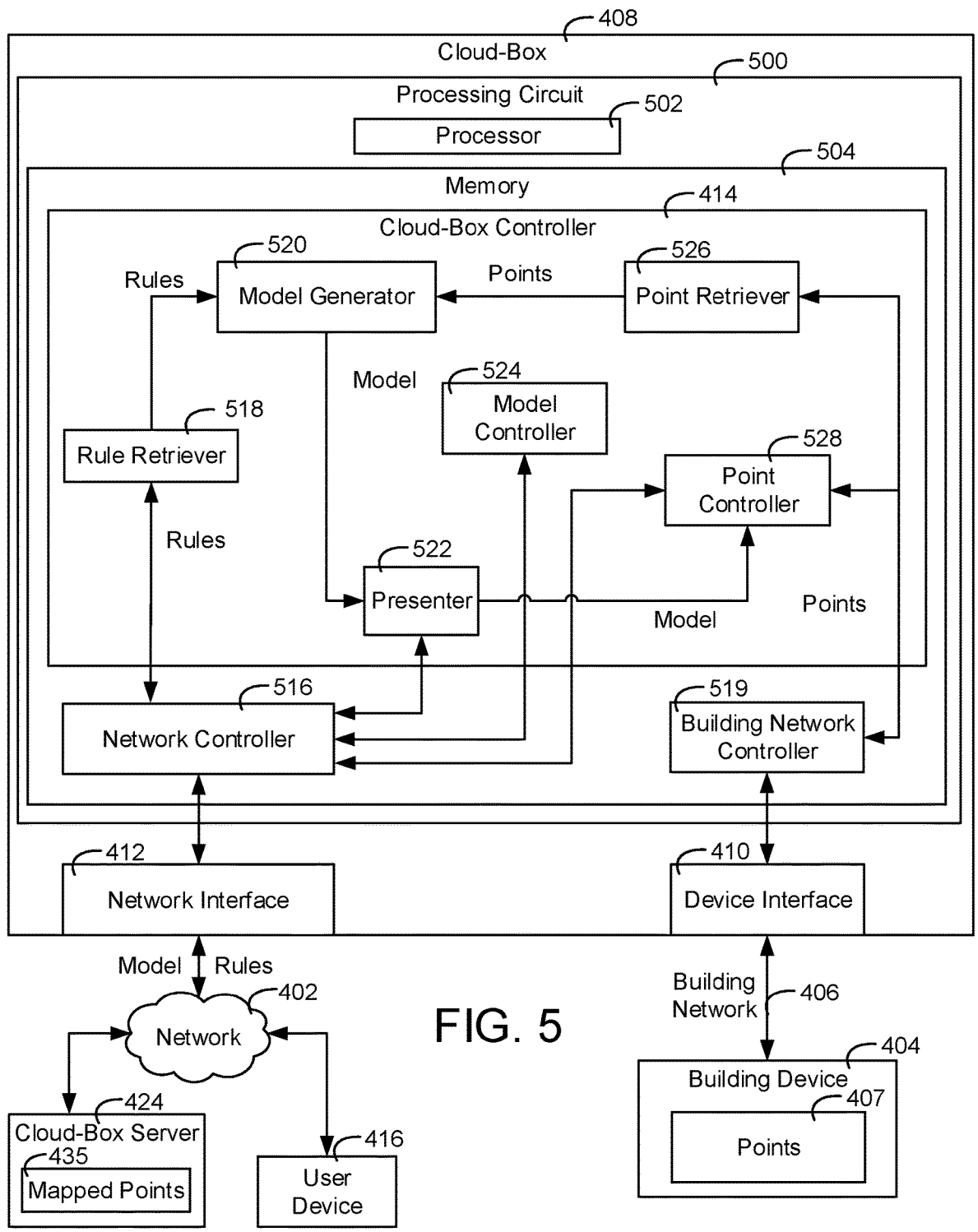
FIG. 5 is a block diagram of the cloud-box of FIG. 4A shown in greater detail, according to an exemplary embodiment.

Referring now to FIG. 5, cloud-box 408 is shown in greater detail, according to an exemplary embodiment. Cloud-box 408 is shown to include network interface 412 and device interface 410 as described with reference to FIG. 4A. Cloud-box 408 is further shown to include processing circuit 500. Processing circuit 500 is shown to include processor 502 and memory 504. Processor 502 can be a general purpose or specific purpose processor, an application specific integrated circuit (ASIC), one or more field programmable gate arrays (FPGAs), a group of processing components, or other suitable processing components. Processor 502 may be configured to execute computer code and/or instructions stored in memory 504 or received from other computer readable media (e.g., CDROM, network storage, a remote server, etc.).

Memory 504 can include one or more devices (e.g., memory units, memory devices, storage devices, etc.) for storing data and/or computer code for completing and/or facilitating the various processes described in the present disclosure. Memory 504 can include random access memory (RAM), read-only memory (ROM), hard drive storage, temporary storage, non-volatile memory, flash memory, optical memory, or any other suitable memory for storing software objects and/or computer instructions. Memory 504 can include database components, object code components, script components, or any other type of information structure for supporting the various activities and information structures described in the present disclosure. Memory 504 can be communicably connected to processor 502 via processing circuit 500 and can include computer code for executing (e.g., by processor 502) one or more processes described herein.

Memory 504 is shown to include cloud-box controller 414 as described with reference to FIG. 4A. Memory 504 is further shown to include network controller 516 and building network controller 519. Network controller 516 can be configured to operate network interface 412. Network interface 412 may include one or more circuits, radios, transformers, and/or other circuit components for communicating via network 402. Network controller 516 may include instructions for operating network interface 412 and causing network interface 412 to send and/or receive data via network 402. Similarly, building network controller 519 may include one or more instructions for causing device interface 410 to communicate (e.g., send and/or receive data) via building device 404. In this regard, device interface 410 may include one or more circuits, radios, transformers, and/or other circuit components for communicating via building network 406.

Cloud-box controller 414 is shown to include rule retriever 518. Rule retriever 518 can be configured to communicate with cloud-box server 424. Rule retriever 518 can be configured to send a request to cloud-box server 424 for one or more rules. In some embodiments, rule retriever 518 can be configured to receive the one or more rules from cloud-box server 424. Rule retriever 518 may send any rules it receives from cloud-box server 424 to model generator 520. Cloud-box controller 414 is also shown to include point retriever 526. Point retriever 526 can be configured to discover points, points 407, that building device 404 has by communicating with building device 404. Point retriever 526 can retrieve points 407 from building device 404. Points 407 may include one or more point names, point IDs, and/or point descriptions. Point retriever 526 can be configured to send any retrieved points, points 407, to model generator 520.

In some embodiments, point retriever 526 receives points 407 via a file uploaded to cloud-box 408. In some embodiments point retriever 526 receives the file from user device 416 and/or otherwise is sent the file via the Internet. In some embodiments, cloud-box 408 includes a USB input, a SD card input, and/or any other input so that a user may put the file on a USB drive and/or an SD card and insert the drive and/or card into cloud-box 408. Point retriever 526 can retrieve the file off of the SD card and/or USB drive. In some embodiments, the file may include a list of points of building device 404. This file may any type of file but may, in some cases, be a controller application file (CAF) file. In some embodiments, the file is stored on building device 404 and is communicated to point retriever 526 via building network 406. For example, point retriever 526 may send a request to building device 404 for the file and building device 404 may respond by sending the file to point retriever 526.

Cloud-box controller 414 is shown to include model generator 520. Model generator 520 can be configured to receive rules from rule retriever 518 and points from point retriever 526. Model generator 520 can be configured to generate a model for building device 404 based on the rules and on the points. In some embodiments, model generator 520 provides the generated model to presenter 522. In various embodiments, model generator 520 uses a pattern matching algorithm to determine the identity of building device 404 based on the rules.

Model generator 520 can be configured to apply the points (e.g., point IDs, point names, and/or point descriptions) against the rules to generate the model. For example, the rules may indicate that one or more sets of point that have specific point identifiers, should create a particular model and/or type of model and/or should be mapped in particular ways. Model generator 520 can be configured to determine if the IDs of the points match any of the sets of points for particular types of models. For example, the rules may indicate that a device with five points of point IDs 44, 45, 46, 47, and 48 are the points of a particular type of thermostat while the five points 35, 36, 37, and 38 are the points of a particular type of sensor. If the points received from point retriever 526 are 44, 45, 47, and 48, model generator 520 may determine that building device 404 is the particular type of thermostat and a model should be generated for building device 404 based on that particular type of thermostat or a model should be retrieved from cloud-box server 424 for the particular type of thermostat. The rules may further indicate that each of the points for the particular thermostat or the particular sensor should be mapped to cloud-box server 424 in a particular way. For example, for the thermostat, point 44 may be a Zone Temperature, point 45 may be a first analog input, point 46 may be a second analog input, and point 47 is a compressor speed.

In some embodiments, model generator 520 can be configured to generate a model for a building device that cloud-box server 424 stores no information for. Model generator 520 may receive rules that identify that there are particular patterns in point IDs for particular types of building devices. For example, the rules may indicate that thermostats have points that start with ID numbers at 50, AHUs have points that start with ID numbers at 150, and sensors have ID numbers that start at 300. The rules may indicate that a point with ID number 50 is usually indoor temperature for a thermostat, a point with ID number 51 is usually humidity sensed by the thermostat, a point with ID number 52 is a binary output of a thermostat, etc. In this regard, based on the rules, model generator 520 can "guess" to determine what each of the points of points 407 are and how they should be mapped to cloud-box server 424. This method may be further used by model generator 520 with point names and/or point descriptions.

In some embodiments, points 407 explicitly indicate the type of building device 404. In various embodiments, building device 404 includes metadata explicitly identifying building device 404. Point retriever 526 can retrieve this metadata and provide the metadata to model generator 520. Points 407 and/or the metadata of building device 404 may identify the exact type (e.g., equipment type, model name, serial number, etc.) of building device 404. In response to receiving this information, model generator 520 can be configured to retrieve a defined model from cloud-box server 424 based on the metadata. Model generator 520 can be configured to send the retrieved model to presenter 522.

In some embodiments, rules retrieved by rule retriever 518 indicate what type of device building device 404 may be but does not include any rules for generating the model. In this regard, model generator 520 can use the points retrieved by point retriever 526 and the rules retrieved by rule retriever 518 that indicate rules for determining the type of building device 404 only. Based on this information, model generator 520 can be configured to determine the identity of building device 404. Model generator 520 can be configured to retrieve a model from cloud-box server 424 based on the identified type of building device 404. Model generator can be configured to use the retrieved model and the points retrieved from building device 404 to generate a model for building device 404. Model generator 520 can provide presenter 522 with the generated model.

Cloud-box controller 414 is further shown to include presenter 522. Presenter 522 can be configured to send the model generated by model generator 520 to user device 416. Via user device 416, a user may accept the model and/or change the model. Presenter 522 may receive a modified model and provide the modified model to point controller 528. In response to receiving an indication from user device 416 that the model is correct, presenter 522 may provide the model received from model generator 520 to point controller 528.

In some embodiments, presenter 522 may receive an indication from user device 416 that a user wants to manually create a model for building device 404. In other similar embodiments, model generator 520 may determine that it cannot properly generate a model for the points retrieved by point retriever 526. In either of these embodiments, presenter 522 may present an indication of all of the points of building device 404 to user device 416. The user may manually create a model for all of the points and then send the model to presenter 522. Presenter 522 can be configured to send the received model to point controller 528.

In some embodiments, cloud-box controller 414 stores the databases of cloud-box server 424 (e.g., device point rules 426, third party device point rules 428, and uploaded models 430). Model generator 520 can be configured to compare the retrieved points against the rules and models stored in the database to generate a model for building device 404. In another embodiment, cloud-box server 424 can be configured to receive the retrieved points from cloud-box 408 and compare the retrieved points against the rules and models of the databases it stores to generate a model for building device 404.

Cloud-box controller 414 is shown to include model controller 524. Model controller 524 can be configured to upload models to cloud-box server 424. Uploading models to cloud-box server 424 may improve the model generation of other models for other building devices. Based on the models received from model controller 524 from a multiple cloud boxes, cloud-box server 424 can be configured to improve the rules stored in cloud-box server 424. In some embodiments, based on manual user changes to a model generated by the model generator 520, the model generator 520 may generate custom and/or otherwise modify or improve rules used to generate the model.

Further, cloud-box controller 414 is shown to include point controller 528. Point controller 528 can be configured to map data read from points 407 to a corresponding point in cloud-box server 424 as defined by the model received from presenter 522. In this regard, cloud-box server 424 may generate corresponding points in cloud-box server 424 that cloud-box server stores. These points may be mapped points 435. The model generated by model generator 520 may indicate what data of points 407 gets sent to what points of mapped points 435 and vice versa. Point controller 528 can be configured to read the data of points 407 by communicating with building device 404 via building network 406. The data read by point controller 528 (e.g., temperature data, airflow data, etc.) for each of the points of points 407 may be sent to a corresponding mapped point of mapped points 435. Similarly data (e.g., adjusting a setpoint) entered into mapped points 435 may be sent to a corresponding mapped point of points 407. The mapping between the points 407 and the mapped points 435 may be defined by the model generated by model generator 520.

Figure 6:
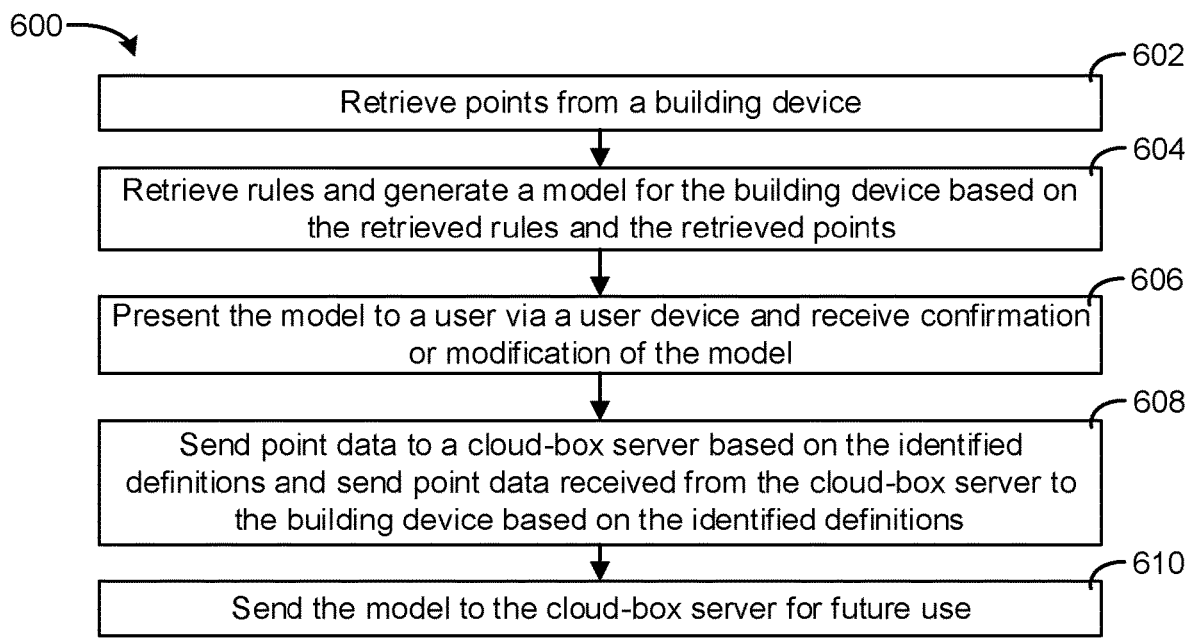
FIG. 6 is a flow diagram of a process for determining a model for a building device based on points retrieved from the building device, according to an exemplary embodiment.

Referring now to FIG. 6, a process 600 for generating a model for a building device is shown, according to an exemplary embodiment. Cloud-box 408, user device 416, and/or cloud-box server 424 can be configured to perform some and/or all of the steps of process 600. For this reason, process 600 is described as being performed by cloud-box 408 and the various components of cloud-box 408.

At step 602, point controller 528 can be configured to retrieve points 407 from building device 404. In some embodiments, point retriever 526 uses a point discovery method (e.g., sends various queries to building device 404 requesting building device 404 send points 407 to point controller 528). At step 604, rule retriever 518 can retrieve rules from cloud-box server 424 and/or one or more databases stored locally on cloud-box 408. In some embodiments, rule retriever 518 sends a request for the rules stored by cloud-box server 424 in device point rules 426 and/or third party device point rules 428. Cloud box server 424 may reply to the request by sending the rules to cloud-box 408. Based on the rules retrieved by rule retriever 518 and the points retrieved by point retriever 526, model generator 520 can be configured to generate a model for building device 404.

In some embodiments, model generator 520 uses the rules and the retrieved points to identify building device 404 and then sends a request to cloud-box server 424 for a model for the identified building device that cloud-box server 424 may store. In a similar embodiment, rule retriever 518 may retrieve metadata from building device 404 that identifies building device 404. In this embodiment, model generator 520 can send cloud-box server 424 a request for model corresponding to the identified building device. In some embodiments, model generator 520 uses the rules to generate mapping for the points of building device 404. The rules may indicate that various sets of points should be mapped in various ways.

At step 606, presenter 522 presents the model generated by model generator 520 to a user via user device 416. A user may review the model via user device 416 and change the model. The user can then confirm that the model is acceptable to the user and an updated model can be sent to presenter 522. If the user confirms the model without changing the model, user device 416 can send presenter 522 an indication of confirmation of the model.

At step 608, point controller 528 can be configured to send data retrieved and/or received from building device 404 for points 407 and send the data to mapped points 435. In some embodiments, the model indicates the mapping of data between points 407 and mapped points 435. In some embodiments, any changes made to mapped points 435 may be sent to cloud-box 408 and point controller 528 can send the data changes (e.g., changes to a setpoint, fan speed, etc.) to building device 404. At step 610, model controller 524 can send the model to cloud-box server 424. In this regard, cloud-box server 424 may be able to update the rules it stores to more accurately determining an appropriate mapping between points and point definitions.

Referring again to FIGS. 4-5, cloud-box 408 is described in further detail. In some embodiments, the rule databases and/or model database, device point rules 426, third party device point rules 428, and/or uploaded models 430 may be stored on cloud-box 408. In this regard, cloud-box 408 does not need to retrieve any device rules or models from cloud-box server 424. In some embodiments, cloud-box 408 may store rules device point rules 426, third party device point rules 428, and/or uploaded models 430 in model generator 520. In various embodiments, cloud-box server 424 may periodically, or whenever updates are available, send cloud-box 408 updates for device point rules 426, third party device point rules 428, and/or uploaded models 430. Similarly, cloud-box 408 may periodically, or whenever updates are available, send cloud-box server 424 any data updates to device point rules 426, third party device point rules 428, and/or uploaded models 430.

In some embodiments, model generator 520 is a component of cloud-box server 424. In this regard, the model for building device 404 may be generated by cloud-box server 424 and sent to cloud-box 408. In some embodiments, cloud-box 408 sends cloud-box server 424 points 407, retrieved metadata, and/or a request to generate the model. In response to receive some and/or all of this information, cloud-box server 424 can be configured to utilize model generator 520 to generate a model for building device 404 and send the generated model to cloud-box 408.

Figure 7:
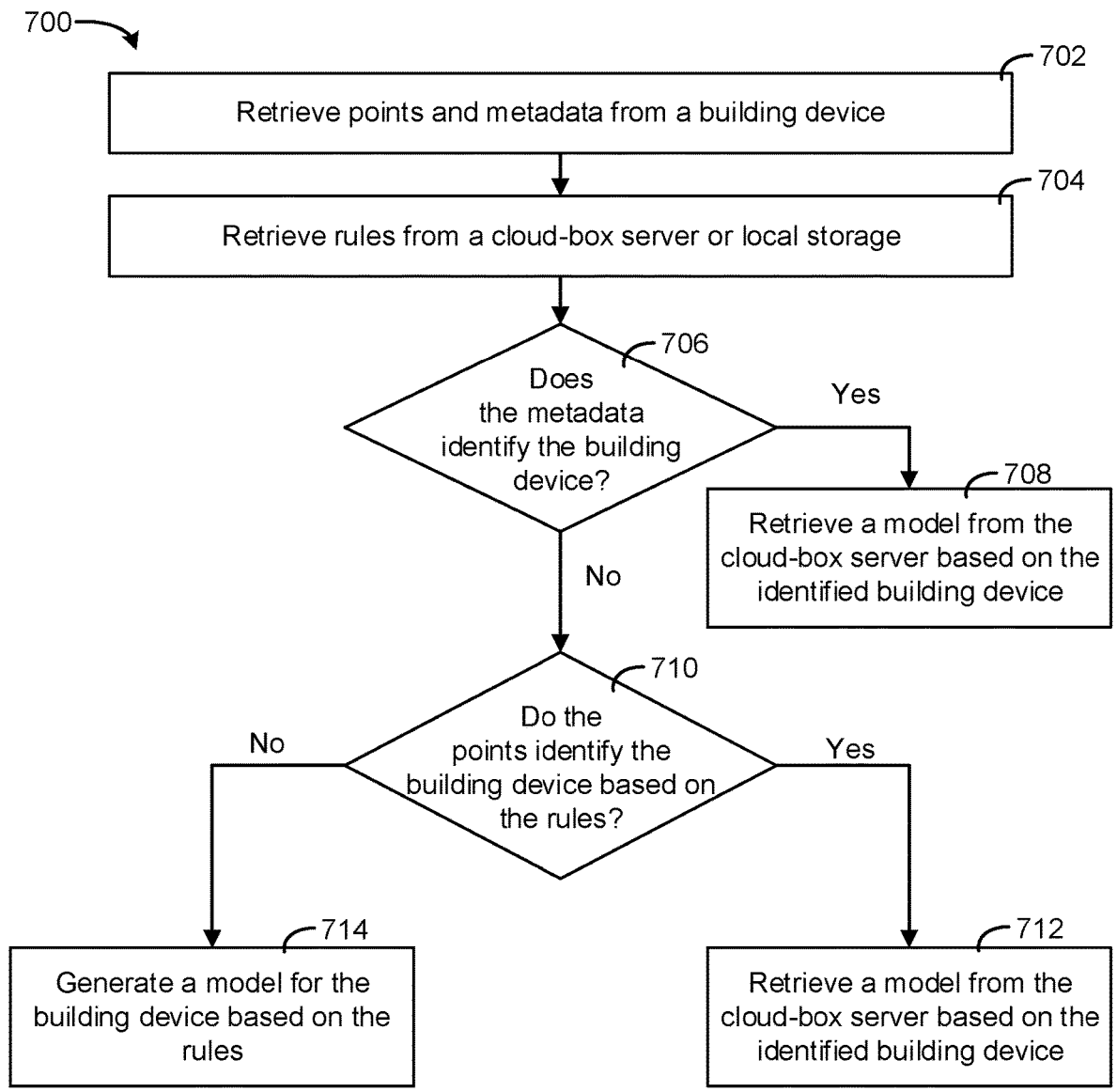
FIG. 7 is a flow diagram of a process for determine or generating a model for a building device based on points and metadata retrieved from the building device and rules retrieved from a cloud-box server.

Referring now to FIG. 7, a process 700 for generating or retrieving a model for a building device is shown, according to an exemplary embodiment. Cloud-box 408, user device 416, and/or cloud-box server 424 can be configured to perform some and/or all of the steps of process 700. For this reason, process 700 is described as being performed by cloud-box 408 and the various components of cloud-box 408.

At steps 702 and 704, cloud-box 408 retrieves points 407 and metadata from building device 404 and rules from cloud-box server 424 and/or rules stored locally on cloud-box 408. Steps 702 may be the same as and/or similar to steps 602 and 604 of process 600 as described with reference to FIG. 6. The points and metadata may be retrieved by point retriever 526 while the rules may be retrieved by rule retriever 518. At step 706, model generator 520 can determine if the metadata retrieved at step 702 identifies building device 404. In some embodiments, model generator 520 may communicate with cloud-box server 424 to determine if the metadata identifies building device 404. In response to determining that the metadata identifies building device 404, model generator 520 can be configured to send a request for a model corresponding to the identity of building device 404 (step 708).

In response to determining that the metadata does not identify building device 404 and/or in response to determining that there is no metadata stored by building device 404 or in response to not being able to retrieve the metadata from building device 404, process 700 can progress to step 710. In some embodiments, the model generator 520 determines whether the metadata identifies a known device. For example, the model generator 520 can provide the metadata and/or an identifier of the metadata to the cloud-box server 424 so that the cloud-box server 424 can determine whether the metadata identifies a known piece of building equipment. The cloud-box server 424 can return a confirmation that the metadata identifies a known piece of building equipment. In some embodiments, the model generator 520 stores a list of known devices and can compare the metadata to the stored list to determine whether the metadata identifies a known piece of building equipment.

At step 710, model generator 520 can determine if the points retrieved at step 702 are points of an identifiable building device based on the result retrieved at step 704. For example, the rules may identify that particular sets of points with particular point identifies may identify a particular building device. In response to determining the identity of building device 404, model generator 520 can retrieve a model from cloud-box server based on the identity of the building device (step 712). In response to not being able to identify the building device, model generator 520 can be configured to perform step 714.

At step 714, model generator 520 can be configured to "guess" a model for building device 404. The rules may identify that particular points are typically mapped in particular ways even if the building device that stores the points cannot be identified. In this regard, model generator 520 may perform various pattern matching algorithms to determine a "fit" for building device 404. The model generated by model generator 520 may be a custom model that may or may not be correct since it is based on rules that may be based on past model creation of other uses in other buildings. Various pattern matching algorithms may be used with the points and the rules to generate a model for building device 404. In some embodiments, the rules indicate various patterns of point identifiers that correspond to particular points. In this regard, a pattern matching algorithm may be used by model generator 520 to determine the model based on the patterns identified by the rules the IDs of the points retrieved in step 702.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for connecting a building device to a server, the system comprising:
 a building network device comprising a processing circuit configured to:
   receive one or more point identifier values from the building device via a building network, wherein each of the one or more point identifier values identifies a data point of the building device;
   receive one or more rules for generating a communication model for the building device from one or more memory devices;
   generate the communication model for the building device based on the received one or more point identifier values and the received one or more rules, wherein the communication model maps the data points of the building device to corresponding data points of the server;

receive, via the building network, data for the data points from the building device; and send, via a second network, the received data for the data points to the corresponding data points on the server based on the communication model.

2. The system of claim 1, wherein the building network device comprises the one or more memory devices, wherein the one or more memory devices are configured to store the one or more rules for generating the communication model.

3. The system of claim 1, wherein the one or more rules comprise one or more identifier patterns that associate particular patterns of the one or more point identifier values with particular communication models, wherein the processing circuit is configured to generate the communication model for the building device by:

performing pattern matching with the one or more identifier values and the one or more identifier patterns of the one or more rules;

determining, based on the pattern matching, that the one or more identifier values match a particular identifier pattern of the one or more identifier patterns, wherein the particular identifier pattern is associated with a particular communication model; and generating the communication model based on the particular communication model.

4. The system of claim 1, wherein the processing circuit of the building network device is configured to generate the communication model for the building device by:

determining an identity of the building device based on the one or more point identifier values and the one or more rules; and retrieving the communication model for the building device from the server based on the identity of the building device.

5. The system of claim 1, wherein the processing circuit of the building network device is configured to:

receive, from the building device via the building network, metadata identifying the building device;

determine whether the metadata identifying the building device identifies a recognized building device;

generate the communication model based on the metadata identifying the building device in response to a determination that the metadata identifies the recognized building device; and generate the communication model for the building device based on the received one or more point identifier values and the received one or more rules in response to a determination that the metadata does not identify the recognized building device.

6. The system of claim 1, wherein the processing circuit of the building network device is configured to:

receive, via the building network, a plurality of point identifiers for a system of building devices comprising a plurality of building devices;

generate a system communication model for the system of building devices based on the received one or more rules;

receive, from the plurality of building devices via the building network, data for data points of the system of building devices; and send, via the second network, the received data for the data points of the system of building devices to corresponding points of the system of building devices on the server based on the system communication model.

7. The system of claim 1, wherein the server comprises the one or more memory devices, wherein the processing circuit of the building network device is configured to receive the one or more rules for generating the communication model for the building device from the one or more memory devices by receiving, via the second network, the one or more rules from the one or more memory devices of the server.

8. The system of claim 1, wherein the one or more rules from the one or more memory devices comprise one or more developer defined rules and one or more custom rules generated based on user feedback.

9. The system of claim 1, wherein the building device is a heating or cooling device configured to control an environmental condition of a building based on the data of the data points.

10. The system of claim 1, further comprising the server, wherein the server comprises a processing circuit configured to:

receive a plurality of communication models, each communication model for one type of building device, wherein each communication model is generated, at least in part, based on user input; and generate a custom rule for the one type of building device based on the plurality of communication models, wherein the custom rule comprises a custom point identifier pattern.

11. The system of claim 10, wherein the processing circuit of the building network device is configured to:

receive, via the building network, one or more second point identifier values for a second building device, wherein the second building device is the one type of building device;

receive the custom rule for the one type of building device from the server; and generate a second communication rule based on the custom rule and the received one or more second point identifier values.

12. The system of claim 1, wherein the processing circuit of the building network device is configured to:

cause a user device to display an interface comprising a description of the communication model;

receive user modifications to the communication model from the user device;

generate an updated communication model based on the received user modifications and the communication model; and send, via the second network, the received data for the data points to the corresponding points on the server based on the updated communication model.

13. The system of claim 12, wherein the description comprises an identification of a plurality of point names and a suggested point identifier value of the one or more point identifier values for each of the point names.

14. A building network device for connecting a building device to a server, the building network device comprising a processing circuit configured to:

receive one or more point identifier values from the building device via a building network, wherein each of the one or more point identifier values identifies a data point of the building device;

receive one or more rules for generating a communication model for the building device from one or more memory devices;

generate the communication model for the building device based on the received one or more point identifier values and the received one or more rules, wherein the communication model maps the data points of the building device to corresponding data points of the server;

receive, via the building network, data for the data points from the building device; and send, via a second network, the received data for the data points to the corresponding data points on the server based on the communication model.

15. The building network device of claim 14, wherein the one or more rules comprise one or more identifier patterns that associate particular patterns of the one or more point identifier values with particular communication models, wherein the processing circuit is configured to generate the communication model for the building device by:

performing pattern matching with the one or more identifier values and the one or more identifier patterns of the one or more rules;

determining, based on the pattern matching, that the one or more identifier values match a particular identifier pattern of the one or more identifier patterns, wherein the particular identifier pattern is associated with a particular communication model; and generating the communication model based on the particular communication model.

16. The building network device of claim 14, wherein the processing circuit of the building network device is configured to:

receive, from the building device via the building network, metadata identifying the building device;

determine whether the metadata identifying the building device identifies a recognized building device;

generate the communication model based on the metadata identifying the building device in response to a determination that the metadata identifies the recognized building device; and generate the communication model for the building device based on the received one or more point identifier values and the received one or more rules in response to a determination that the metadata does not identify the recognized building device.

17. The building network device of claim 14, wherein the processing circuit of the building network device is configured to:

cause a user device to display an interface comprising a description of the communication model, wherein the description comprises a identification of a plurality of point names and a suggested point identifier value of the one or more point identifier values for each of the point names;

receive user modifications to the communication model from the user device;

generate an updated communication model based on the received user modifications and the communication model; and send, via the second network, the received data points to the corresponding points on the server based on the updated communication model.

18. A method for connecting a building device to a server by a building network device, the method comprising:

receiving, by the building network device, one or more point identifier values from the building device via a building network, wherein each of the one or more point identifier values identifies a data point of the building device, wherein the building network device is connected to the building device via a device interface of the building network device and connected to the server via a network interface of the building network device;

receiving, by the building network device, one or more rules for generating a communication model for the building device from one or more memory devices;

generating, by the building network device, the communication model for the building device based on the received one or more point identifier values and the received one or more rules, wherein the communication model maps the data points of the building device to corresponding data points of the server, wherein generating, by the building network device, the communication model for the building device comprises:

performing pattern matching with the one or more identifier values and one or more identifier patterns of the one or more rules;

determining, based on the pattern matching, that the one or more identifier values match a particular identifier pattern of the one or more identifier patterns, wherein the particular identifier pattern is associated with a particular communication model; and generating the communication model based on the particular communication model;

receiving, by the building network device via the building network, data for the data points from the building device; and sending, by the building network device via a second network, the received data for the data points to the corresponding data points on the server based on the communication model.

19. The method of claim 18, further comprising:

causing, by the building network device, a user device to display an interface comprising a description of the communication model, wherein the description comprises a identification of a plurality of point names and a suggested point identifier value of the one or more point identifier values for each of the point names;

receiving, by the building network device, user modifications to the communication model from the user device;

generating, by the building network device, an updated communication model based on the received user modifications and the communication model; and sending, by the building network device via the second network, the received data for the data points to the corresponding points on the server based on the updated communication model.

20. The method of claim 18, further comprising:

receiving, by the server, a plurality of communication models, each communication model for one type of building device, wherein each communication model is generated, at least in part, based on user input;

generating, by the server, a custom rule for the one type of building device based on the plurality of communication models, wherein the custom rule comprises a custom point identifier pattern;

receiving, by the building network device via the building network, one or more second point identifier values for a second building device, wherein the second building device is the one type of building device;

receiving, by the building network device, the custom rule for the one type of building device from the server; and generating, by the building network device, a second communication rule based on the custom rule and the received one or more second point identifier values.

* * * * *